United States Patent
Seregin et al.

(10) Patent No.: US 12,149,707 B2
(45) Date of Patent: Nov. 19, 2024

(54) INTRA BLOCK COPY PREDICTION RESTRICTIONS IN VIDEO CODING

(71) Applicant: QUALCOMM Incorporated, San Diego, CA (US)

(72) Inventors: Vadim Seregin, San Diego, CA (US); Luong Pham Van, San Diego, CA (US); Wei-Jung Chien, San Diego, CA (US); Cheng-Teh Hsieh, Del Mar, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 71 days.

(21) Appl. No.: 17/817,128

(22) Filed: Aug. 3, 2022

(65) Prior Publication Data

US 2022/0377350 A1  Nov. 24, 2022

Related U.S. Application Data

(63) Continuation of application No. 16/663,033, filed on Oct. 24, 2019, now Pat. No. 11,418,796.
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/96* (2014.11)

(58) Field of Classification Search
CPC .. H04N 19/159; H04N 19/105; H04N 19/176; H04N 19/96; H04N 19/593
(Continued)

(56) References Cited

U.S. PATENT DOCUMENTS 10,200,713 B2   2/2019   Pang et al.
10,477,232 B2   11/2019  Pang et al.
(Continued)

FOREIGN PATENT DOCUMENTS

WO   2015143346 A1   9/2015
WO   2016183216 A1   11/2016

OTHER PUBLICATIONS

Iwata K., et al., "Intra Texture Prediction Based on Repetitive Pixel Replenishment", Image Processing (ICIP), Sep. 30, 2012, 19th IEEE International Conference on, IEEE, (Sep. 30, 2012), pp. 2933-2936.
(Continued)

*Primary Examiner* — Susan E. Torgerson
(74) *Attorney, Agent, or Firm* — Shumaker & Sieffert, P.A.

(57) ABSTRACT

An example method includes determining, for each respective coding block of a plurality of coding blocks of a current coding tree unit (CTU) of video data in a current picture of video data, a respective search area of a plurality of respective search areas, wherein at least one of the plurality of search areas includes samples of the current picture located outside of the current CTU, and wherein at least one of the plurality of search areas does not include samples of the current picture located outside of the current CTU; selecting, for each respective coding block and from within the respective search area for the respective coding block, a respective predictor block of a plurality of predictor blocks; and reconstructing samples of each respective coding block based on samples included in a corresponding predictor block in the plurality of predictor blocks.

20 Claims, 19 Drawing Sheets

Related U.S. Application Data

(60) Provisional application No. 62/751,585, filed on Oct. 27, 2018.

(51) Int. Cl.
  *H04N 19/176*  (2014.01)
  *H04N 19/96*  (2014.01)

(58) Field of Classification Search
  USPC .......................................................... 375/240
  See application file for complete search history.

(56) References Cited

U.S. PATENT DOCUMENTS

| | | |
|---|---|---|
| 2015/0071357 A1 | 3/2015 | Pang et al. |
| 2019/0208217 A1* | 7/2019 | Zhou .................... H04N 19/139 |
| 2020/0112735 A1 | 4/2020 | Xu et al. |
| 2020/0137400 A1 | 4/2020 | Seregin et al. |

OTHER PUBLICATIONS

Alshina E., et al., "AhG5: Intra Block Copy within One LCU", 15. JCT-VC Meeting; Oct. 23, 2013-Nov. 1, 2013; Geneva; CH; (Joint Collaborative Team on Video Coding of ISO/IEC JTC1/SC29/WG11 and ITU-T SG.16); URL: http://wftp3.itu.int/av-arch/jctvc-site/, No. JCTVC-O0074-v4, Oct. 26, 2013 (Oct. 26, 2013), XP030115053, Oct. 23, 2013, 7 Pages.

Alshina E., et al: "RCE3: Intra Block Copy Search Range (tests A)", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0211, Jan. 4, 2014, 11 pages, XP030115748.

Bross B., et al., "Versatile Video Coding (Draft 2)", 11. JVET Meeting, Jul. 11, 2018-Jul. 18, 2018, Ljubljana, (The Joint Video Exploration Team of ISO/IEC JTC1/SC29/WG11 and ITU-T SG 16 WP3), No. JVET-K1001-v6, Sep. 21, 2018 (Sep. 21, 2018), XP030193577, 135 Pages.

Chen C., et al., "Screen Content Coding Using Non-Square Intra Block Copy for HEVC," 2014 IEEE International Conference on Multimedia and Expo (ICME), Chengdu, 2014, pp. 1-6, DOI: 10.1109/ICME.2014.6890229.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

Ergen S., "ZigBee/IEEE 802.15.4 Summary", Sep. 10, 2004, 37 Pages.

Hsu C-W., et al: "CE1-related: Constraint for binary and Ternary Partitions", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0556, Jul. 16, 2018, pp. 1-3, XP030199971, Retrieved from the Internet: URL: http://phenix.int-evry.fr/jvet/doc_end_user/documents/11_Ljubljana/wg11/JVET-K0556-v1.zip JVET-K0556-v1.docx [retrieved on Jul. 16, 2018].

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/058119—ISA/EPO—Jan. 10, 2020, 16 pp.

ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.

Li X., et al., "Description of SDR video coding technology proposal by Tencent", 10. JVET Meeting; Apr. 10, 2018-Apr. 20, 2018; San Diego; (The Joint Video Exploration Team of ISO/IEC JTC1/SC29/WG11 and ITU-T SG.16 ); URL: http://phenix.int-evry.fr/jvet/, No. JVET-J0029, Apr. 3, 2018 (Apr. 3, 2018), XP030151198, 34 Pages, p. 8. paragraph 2.1.10.4.

Ma (Fraunhofer) J., et al: "Description of Core Experiment 1 (CE1): Partitioning", 11. JVET Meeting; Jul. 10, 2018-Jul. 18, 2018; Ljubljana; (The Joint Video Exploration Team of ISO/IEC JTC1/SC29/WG11 and ITU-T SG.16), No. JVET-K1021, Sep. 14, 2018, pp. 1-7, XP030193560, Retrieved from the Internet: URL: http://phenix.int-evry.fr/jvet/doc_end_user/documents/11_Ljubljana/wg11/JVET-K1021-v3.zip JVET-K1021_v1.docx [retrieved on Sep. 14, 2018].

Pham Van (Qualcomm) L., et al: "CE8-related: Restrictions for the Search Area of the IBC Blocks in CPR", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0404, Oct. 2, 2018, pp. 1-6, XP030194329, Retrieved from the Internet: URL: http://phenix.int-evry.fr/jvet/doc_end_user/documents/12_Macao/wg11/JVET-L0404-v2.zip JVET-L0404.docx [retrieved on Oct. 2, 2018] the whole document.

Xu X., et al., "CE8: CPR Reference Memory Reuse Without Increasing Memory Requirement (CE8.1.2a and CE8.1.2d)", Joint Video Experts Team (JVET) of ITU-T SG 16 WP 3 and ISO/IEC JTC 1/SC 29/WG 11, JVET-M0407-v3, Jan. 9-18, 2019, 10 pages.

Xu X., et al., "CE8-2.2: Current Picture Referencing using Reference Index Signaling", Joint Video Experts Team (JVET) of ITU-T SG 16 WP 3 and ISO/IEC JTC 1/SC 29/WG 11, JVET-K0076-v3, 11th Meeting: Ljubljana, SI, Jul. 10-18, 2018, 9 pages.

Xu X., et al., "Intra Block Copy Improvement on Top of Tencent's CfP Response", Joint Video Experts Team (JVET) of ITU-T SG 16 WP 3 and ISO/IEC JTC 1/SC 29/WG 11, JVET-J0050-r2, Apr. 10-20, 2018, 3 pages.

Xu X., et al., "Intra Block Copy in HEVC Screen Content Coding Extensions", IEEE Journal on Emerging and Selected Topics in Circuits and Systems, IEEE, Piscataway, NJ, USA, vol. 6, No. 4, Dec. 1, 2016 (Dec. 1, 2016), pp. 409-419, XP011636923, ISSN: 2156-3357, DOI:10.1109/JETCAS.2016.2597645, [retrieved on Dec. 12, 2016].

* cited by examiner

INTRA BLOCK COPY PREDICTION RESTRICTIONS IN VIDEO CODING

This application is a continuation of U.S. patent application Ser. No. 16/663,033, filed 24 Oct. 2019, which claims the benefit of U.S. Provisional Patent Application No. 62/751,585, filed 27 Oct. 2018, the entire content of each application is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for improving the coding efficiency and/or the memory requirements of coding video data using current picture reference (CPR)/intra block copy (IBC) mode. For instance, a video coder (e.g., video encoder or video decoder) may utilize a different search area for each coding block of a coding tree unit (CTU) of a current picture. In particular, at least some of the search areas may include samples of the current picture located outside of the current CTU, and at least some of the search areas may not include samples of the current picture located outside of the current CTU. The techniques of this disclosure may be used with screen content coding, including the support of possibly high bit depth (more than 8 bit), different chroma sampling format such as 4:4:4, 4:2:2, 4:2:0, 4:0:0, and other techniques.

As one example, a method includes determining, for each respective coding block of a plurality of coding blocks of a current coding tree unit (CTU) of video data in a current picture of the video data, a respective search area of a plurality of respective search areas, wherein the search areas of the plurality of search areas are all different, wherein at least one of the plurality of search areas includes samples of the current picture located outside of the current CTU, and wherein at least one of the plurality of search areas does not include samples of the current picture located outside of the current CTU; selecting, for each respective coding block and from within the respective search area for the respective coding block, a respective predictor block of a plurality of predictor blocks; and reconstructing samples of each respective coding block based on samples included in a corresponding predictor block in the plurality of predictor blocks.

As another example, a device for coding video data includes a memory configured to store the video data; and one or more processors implemented in circuitry and configured to: determine, for each respective coding block of a plurality of coding blocks of a current coding tree unit (CTU) of the video data in a current picture of video data, a respective search area of a plurality of respective search areas, wherein the search areas of the plurality of search areas are all different, wherein at least one of the plurality of search areas includes samples of the current picture located outside of the current CTU, and wherein at least one of the plurality of search areas does not include samples of the current picture located outside of the current CTU; select, for each respective coding block and from within the respective search area for the respective coding block, a respective predictor block of a plurality of predictor blocks; and reconstruct samples of each respective coding block based on samples included in a corresponding predictor block in the plurality of predictor blocks.

As another example, a video coder includes means for determining, for each respective coding block of a plurality of coding blocks of a current coding tree unit (CTU) of video data in a current picture of video data, a respective search area of a plurality of respective search areas, wherein the search areas of the plurality of search areas are all different, wherein at least one of the plurality of search areas includes samples of the current picture located outside of the current CTU, and wherein at least one of the plurality of search areas does not include samples of the current picture located outside of the current CTU; means for selecting, for each respective coding block and from within the respective search area for the respective coding block, a respective predictor block of a plurality of predictor blocks; and means for reconstructing samples of each respective coding block based on samples included in a corresponding predictor block in the plurality of predictor blocks.

As another example, a computer-readable storage medium stores instructions that, when executed, cause one or more processors to: determine, for each respective coding block of a plurality of coding blocks of a current coding tree unit (CTU) of video data in a current picture of video data, a respective search area of a plurality of respective search areas, wherein the search areas of the plurality of search areas are all different, wherein at least one of the plurality of search areas includes samples of the current picture located outside of the current CTU, and wherein at least one of the plurality of search areas does not include samples of the current picture located outside of the current CTU; select, for each respective coding block and from within the respective search area for the respective coding block, a respective predictor block of a plurality of predictor blocks; and reconstruct samples of each respective coding block based on samples included in a corresponding predictor block in the plurality of predictor blocks.

The details of one or more examples are set forth in the accompanying drawings and the description below. Other features, objects, and advantages will be apparent from the description, drawings, and claims.

DETAILED DESCRIPTION

Figure 1:
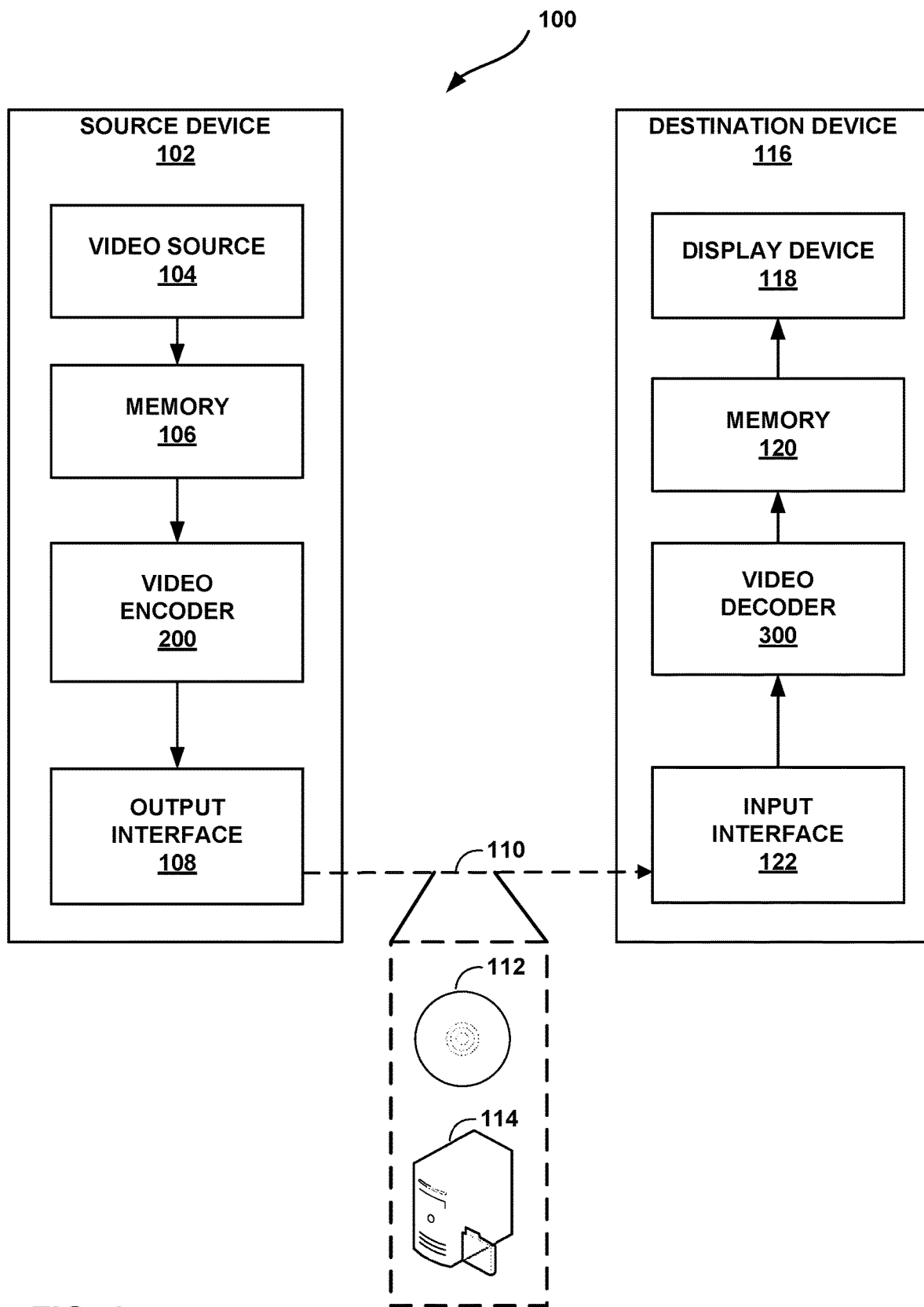
FIG. 1 is a block diagram illustrating an example video encoding and decoding system that may perform the techniques of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (JVET), a collaborative team formed by MPEG and ITU-T Study Group 16's VCEG is recently working on a new video coding standard to be known as Versatile Video Coding (VVC). The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. The development of the VVC standard is expected to be completed in 2020.

Current picture referencing (CPR) or Intra block copy (IBC) (described in X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, no. 4, pp. 409-419, 2016) has been proposed during the standardization of HEVC SCC extensions (see e.g., High Efficiency Video Coding (HEVC), Rec. ITU-T H.265 and ISO/IEC 23008-2, December 2016). IBC has been proved to be efficient when coding of screen content video materials. This method was previously proposed in JVET-J0029 and JVET-J0050 to address the need for efficient screen content coding. In the $11^{st}$ JVET meeting, CPR mode (Xiaozhong Xu, Xiang Li and Shan Liu, "CE8-2.2: Current picture referencing using reference index signaling", JVET-K0076, Ljubljana, SL, July 2018 (hereinafter "JVET-K0076")) was adopted into Benchmark Set (BMS) software of VVC for further evaluation.

The current picture reference (CPR) mode described in JVET-K0076 has been adopted into the BMS software. In the CPR mode, a video coder predicts an intra block copy (IBC) block in a current picture from an already decoded predictor block (before in-loop filtering, such as one or both of adaptive loop filter (ALF) and Sample Adaptive Offset (SAO)) of the current picture. For instance, to predict a current block using the CPR mode, a video encoder may select a predictor block from with in a reference area. The video encoder may select the predictor block as a block in the reference area with that most closely match samples of the current block (e.g., to reduce the size of residual data). The video encoder may encode a vector (e.g., a block vector, a motion vector, etc.) that represents a displacement between the current block and the selected predictor block along with residual data that represents differences between samples of the predictor block and samples of the current block. The video decoder may decode the current block using a reciprocal process. For instance, the video decoder may decode the vector and the residual data, select the predictor block based on the vector, and reconstruct the samples of the current block based on the samples of the predictor block and the residual data.

In the current CPR mode, the reference area (i.e., the area of the current picture from which the predictor block may be selected) may be restricted to reconstructed samples of a current coding tree unit (CTU) that includes the block being predicted. As such, in the current CPR more, a video coder may predict coding blocks of a particular CTU using predictor blocks located in the particular CTU. Restricting the reference area to the current CTU may reduce the memory needed to predict blocks using the CPR mode. For instance, restricting the reference area to the current CTU may enable a video coder to only access/store samples of the current CTU when coding the current CTU. However, this limitation may reduce the performance of CPR coding in comparison to having a larger reference area. In particular, restricting the reference area to the current CTU may reduce the probability that a predictor block with samples matching the current block may be utilized, which may result in an increase in residual data size. Increasing the size of the residual data may undesirably decrease the coding efficiency (e.g., require more bits to represent the video data).

In accordance with one or more techniques of this disclosure, a video coder (e.g., video encoder 200 and/or video decoder 300) may utilize hybrid search areas when coding blocks of video data using the CPR mode. For instance, the video coder may utilize a different search area for each coding block of a CTU of a current picture. The search areas may be considered hybrid in that the search area for at least one coding block includes samples of the current picture located outside of the current CTU, and the search area for at least one coding block does not include samples of the current picture located outside of the current CTU. By utilizing hybrid search areas, the video coder may balance the memory used to perform CPR with the coding efficiency.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for hybrid search areas for CPR. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for hybrid search areas for CPR. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (WET) of ITU-T SG 16 WP 3 and ISO/IEC JTC 1/SC 29/WG 11, 11th Meeting: Ljubljana, SI, 10-18 Jul. 2018, JVET-K1001-v6 (hereinafter "VVC Draft 2"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Figure 2:
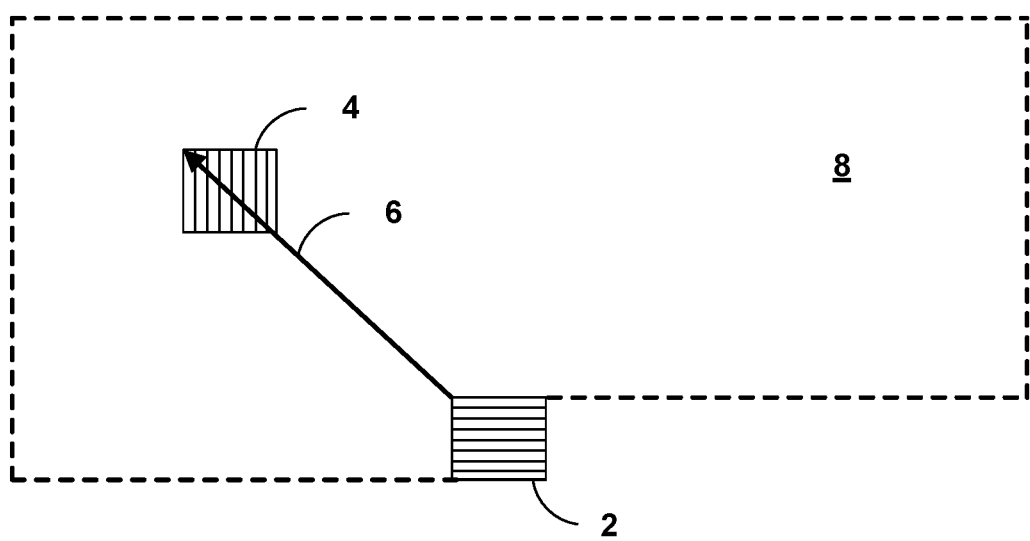
FIG. 2 is a diagram illustrating an example of an intra block copying process, in accordance with one or more techniques of this disclosure.

FIG. 2 is a diagram illustrating an example of a current picture reference (CPR) coding process, in accordance with one or more techniques of this disclosure. According to one example CPR process, video encoder 200 may select a predictor video block, e.g., from a set of previously coded and reconstructed blocks of video data located in a search area. In the example of FIG. 1, search area 8 includes the set of previously coded and reconstructed video blocks. The blocks in the search area 8 may represent blocks that have been decoded and reconstructed by video decoder 300 and stored in decoded picture buffer 314, or blocks that have been decoded and reconstructed in the reconstruction loop of video encoder 200 and stored in decoded picture buffer 218. Current block 2 represents a current block of video data to be coded. Predictor block 4 represents a reconstructed video block, in the same picture as current block 2, which is used for Intra BC prediction of current block 2.

In the example CPR process, video encoder 200 may determine and encode motion vector 6, which indicates the position of predictor block 4 relative to current block 2, together with the residue signal. For instance, as illustrated by FIG. 1, motion vector 6 may indicate the position of the upper-left corner of predictor block 4 relative to the upper-left corner of current block 2. Motion vector 6 may also be referred to as an offset vector, displacement vector, or block vector (BV). Video decoder 300 may utilize the encoded information for decoding the current block.

As discussed above, in the current CPR mode, the reference area (e.g., search area 8) may be restricted to reconstructed samples of a current coding tree unit (CTU) that includes the block being predicted (e.g., a CTU that includes current block 2). This restriction may be advantageous in that it reduces the amount of memory required to perform CPR. However, as also discussed above, this restriction may reduce the coding efficiency of CPR.

In accordance with one or more techniques of this disclosure, a video coder (e.g., video encoder 200 and/or video decoder 300) may utilize hybrid search areas when coding blocks of video data using the CPR mode. For instance, the video coder may determine, for each respective coding block of a plurality of coding blocks of a current coding tree unit (CTU) of video data in a current picture of video data, a respective search area of a plurality of respective search areas. The search areas of the plurality of search areas may all be different. For instance, the search area used for any given coding block of a CTU may be different that the search area used for any other coding block of the CTU. The search areas may be considered hybrid in that the search area for at least one coding block includes samples of the current picture located outside of the current CTU, and the search area for at least one coding block does not include samples of the current picture located outside of the current CTU. By utilizing hybrid search areas, the video coder may balance the memory used to perform CPR with the coding efficiency.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 3A:
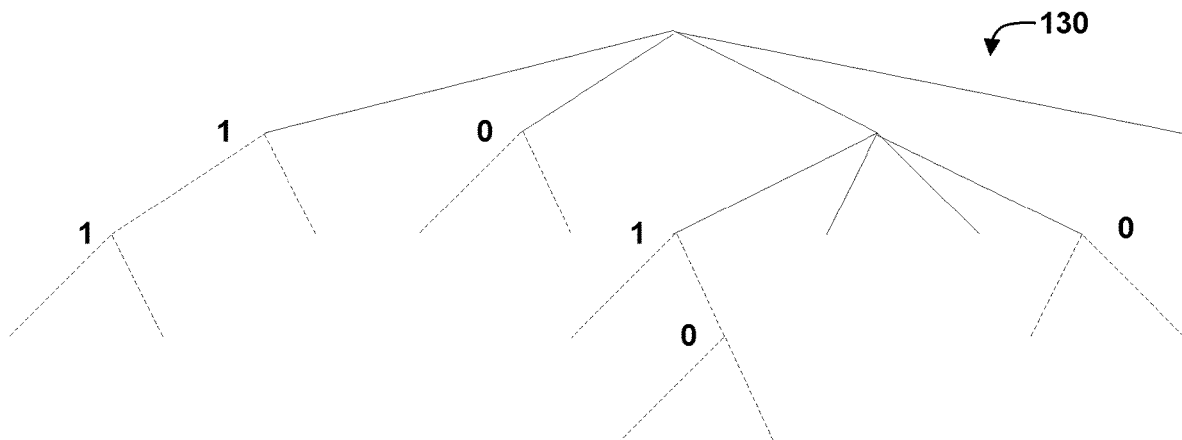
FIGS. 3A and 3B are conceptual diagrams illustrating an example quadtree binary tree (QTBT) structure, and a corresponding coding tree unit (CTU).
Figure 3B:
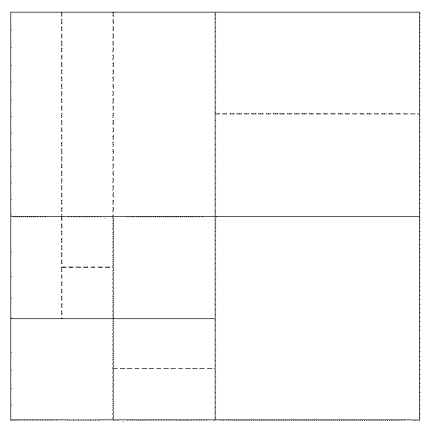

FIGS. 3A and 3B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 3B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks," "coding blocks," or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

In some examples, the video coder may perform block compensation with integer block compensation for the luma components that are coded with CPR. In this way, the video coder may avoid performing interpolation for luma components. In some examples, the video coder may perform block compensation for chroma components using sub-pel block compensation. As such, the video coder may perform interpolation for chroma components.

Figure 4:
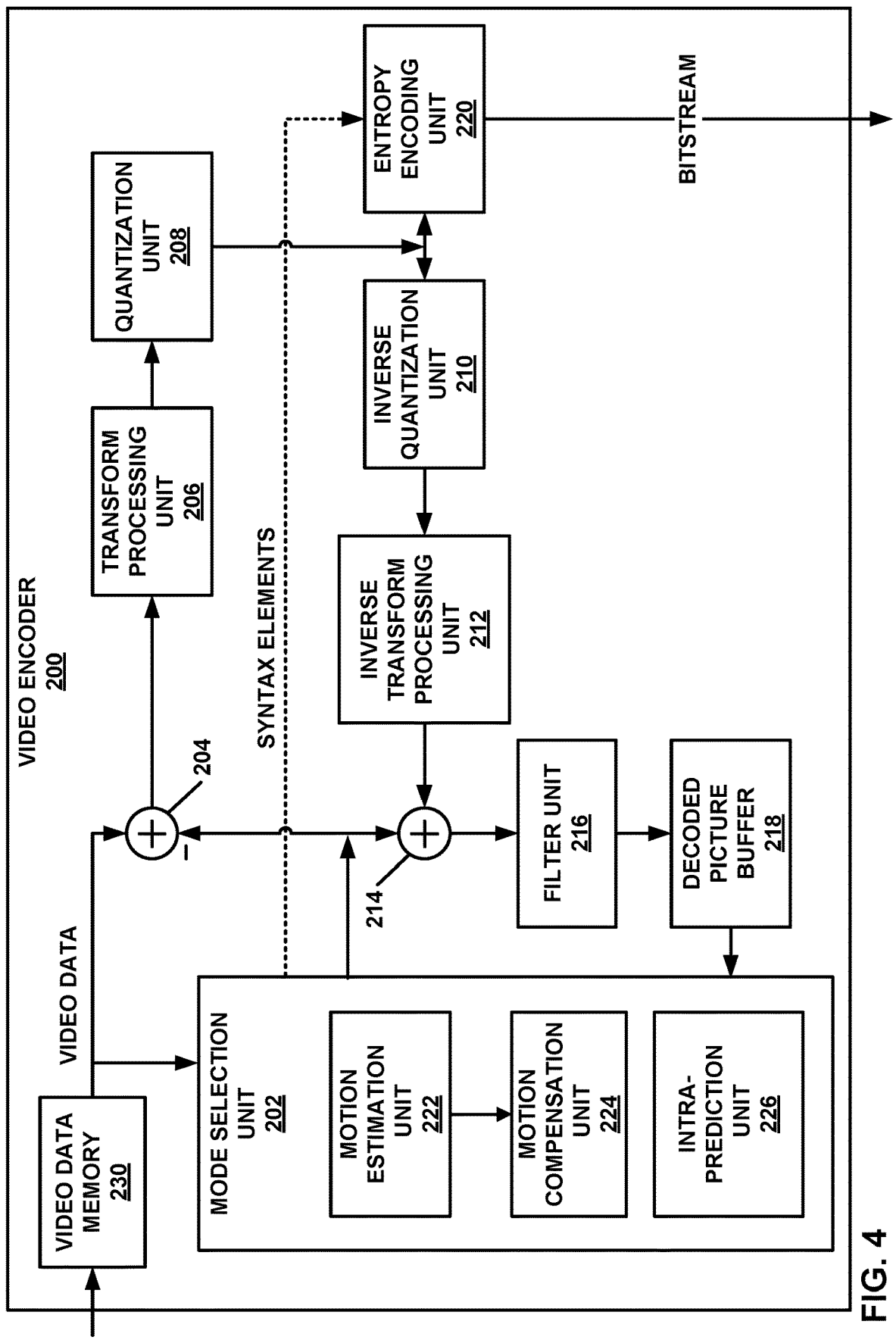
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine, for each respective coding block of a plurality of coding blocks of a current coding tree unit (CTU) of video data in a current picture of video data, a respective search area of a plurality of respective search areas, wherein the search areas of the plurality of search areas are all different (i.e., no two search regions encompass an identical area, though some search regions may overlap), wherein at least one of the plurality of search areas includes samples of the current picture located outside of the current CTU, and wherein at least one of the plurality of search areas does not include samples of the current picture located outside of the current CTU; select, for each respective coding block and from within the respective search area for the respective coding block, a respective predictor block of a plurality of predictor blocks; reconstruct samples of each respective coding block based on samples included in a corresponding predictor block in the plurality of predictor blocks; and encode, in a video bitstream and for each respective coding block of the plurality of coding blocks, one or more syntax elements that represent a value of a respective vector that identifies the selected predictor block.

Figure 5:
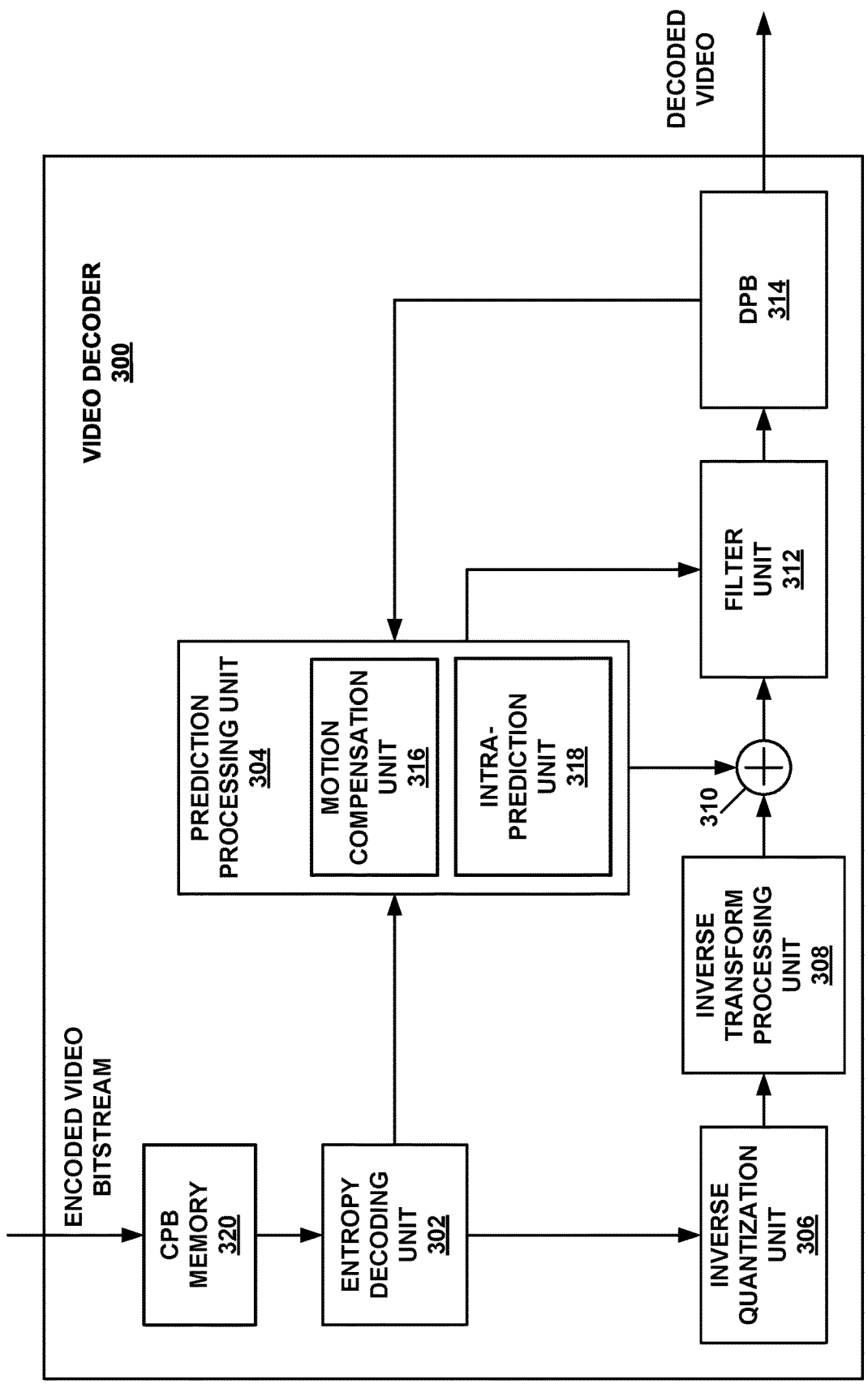
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine, for each respective coding block of a plurality of coding blocks of a current coding tree unit (CTU) of video data in a current picture of video data, a respective search area of a plurality of respective search areas, wherein the search areas of the plurality of search areas are all different, wherein at least one of the plurality of search areas includes samples of the current picture located outside of the current CTU, and wherein at least one of the plurality of search areas does not include samples of the current picture located outside of the current CTU; decode, from a video bitstream and for each respective coding block of the plurality of coding blocks, one or more syntax elements that represent a value of a vector that identifies a predictor block in the respective search area; select, for each respective coding block and based on the respective vector, the respective predictor block of a plurality of predictor blocks; and reconstruct samples of each respective coding block based on samples included in a corresponding predictor block in the plurality of predictor blocks.

Figure 6:
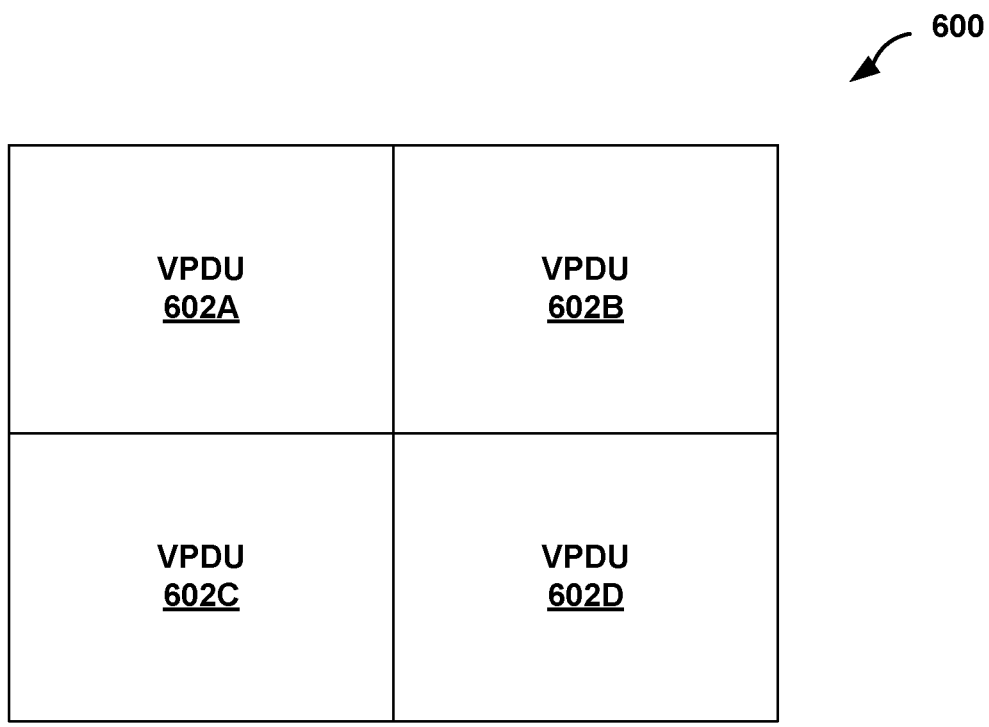
FIG. 6 is a conceptual diagram illustrating a CTU coded using a pipeline, in accordance with one or more techniques of this disclosure.

FIG. 6 is a conceptual diagram illustrating a coding tree unit (CTU) coded using a pipeline, in accordance with one or more techniques of this disclosure. As shown in FIG. 6, CTU 600 may be split into virtual pipeline data units (VPDUs) 602A-602D (collectively, "VPDUs 602"). For instance, where CTU 600 include 128×128 samples, CTU 600 may be split into VPDUs 602, each of which may include 64×64 samples. In some implementations of CPR, video coders (e.g., video encoder 200 and/or video decoder 300) may utilize pipelines configured to process coding units of 64×64 samples.

As discussed above, this disclosure describes techniques in which a video coder may include samples from outside of a current CTU in search areas used when predicting coding blocks of the current CTU using CPR (e.g., CPR search areas). This disclosure describes several techniques for extending the CPR search areas, each of which may be used independently or in combination with any other technique.

In accordance with a first technique of this disclosure, a video coder may include A rows above the current CTU and B columns to the left of the current CTU in the CPR search area. The available number of lines A and B may depend on pixels used by other tools such as intra prediction and deblocking filter. Including these samples may not significantly increase the memory requirements as the samples around a CTU may already be used for intra prediction and deblocking filtering.

In accordance with a second technique of this disclosure, a video coder may use different search areas for different coding blocks in the current CTU. For instance, the video coder may selectively include A rows above the current CTU and B columns to the left of the current CTU (e.g., the search area of the first technique) in the CPR search area used for some coding blocks but not others. As one example, the video coder may selectively include A rows above the current CTU and B columns to the left of the current CTU in the CPR search area uses for coding blocks located at the left and/or above borders of the current CTU.

Figure 7:
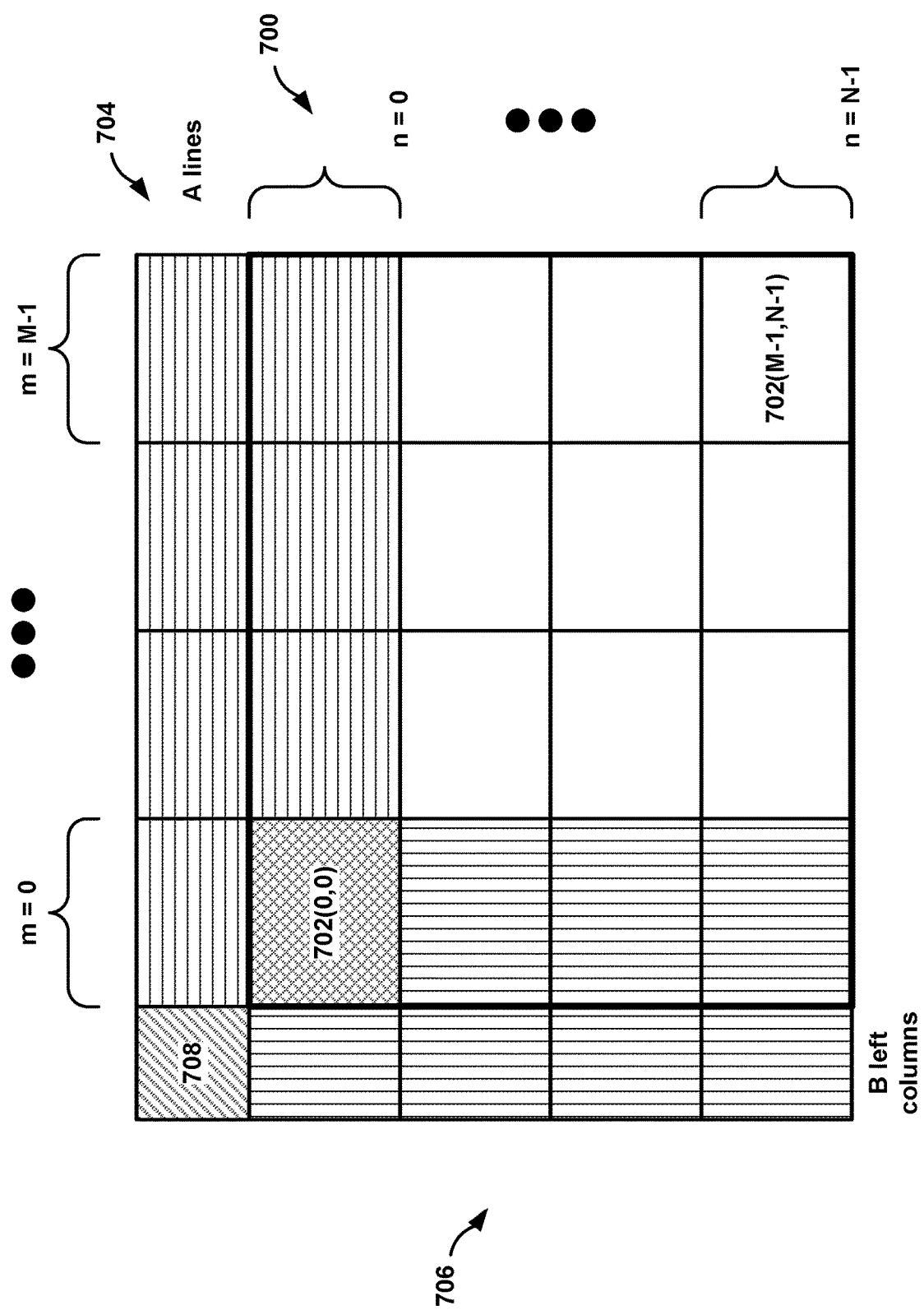
FIG. 7 is a conceptual diagram illustrating example search areas used for CPR, in accordance with one or more techniques of this disclosure.

FIG. 7 is a conceptual diagram illustrating example search areas used for CPR, in accordance with one or more techniques of this disclosure. As shown in FIG. 7, CTU 700 may divided into M×N coding blocks 702(0,0)-702(M−1,N−1). As discussed above, a video coder may use different search areas for different coding blocks in the current CTU. The search area used for a particular coding block of a CTU may be determined based on the location of the particular coding block within the CTU. As one example, the video coder may include samples from A above lines from above-neighboring CTUs 704 and top-left neighboring CTU 708 in search areas for coding blocks located in a topmost row of CTU 700 (i.e., coding blocks in row n=0). As another example, the video coder may include samples from B left columns from left-neighboring CTUs 706 and top-left neighboring CTU 708 in search areas for coding blocks located in a leftmost column of CTU 700 (i.e., coding blocks in column m=0). As such, the search area for coding block 702(0,0) may include both A above lines from above-neighboring CTUs 704 and top-left neighboring CTU 708 along with B left columns from left-neighboring CTUs 706 and top-left neighboring CTU 708.

Figure 8:
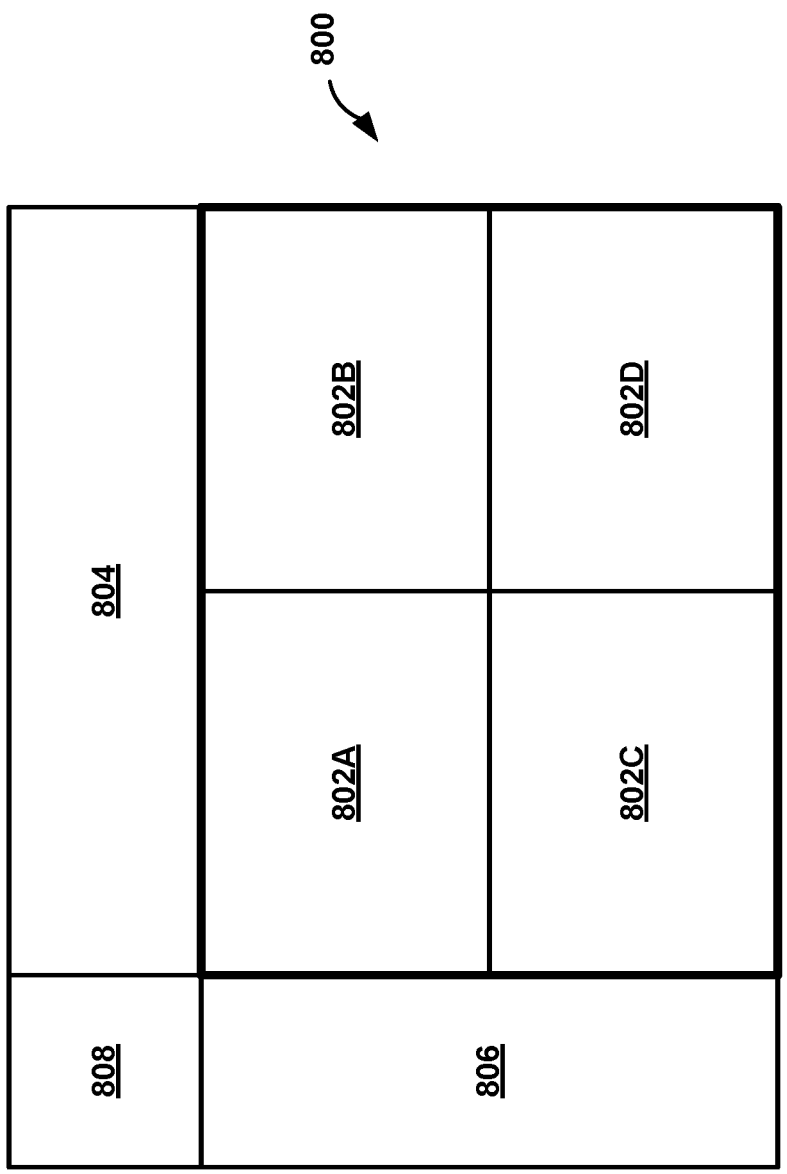
FIG. 8 is a conceptual diagram illustrating example search areas used for CPR, in accordance with one or more techniques of this disclosure.

FIG. 8 is a conceptual diagram illustrating example search areas used for CPR, in accordance with one or more techniques of this disclosure. As shown in FIG. 8, CTU 800 may divided into four coding blocks 802A-802D (collectively, "coding blocks 802"). In some examples, coding blocks 802 may be referred to as VPDUs. For instance, where CTU 800 include 128×128 samples, CTU 800 may be split into VPDUs 802, each of which may include 64×64 samples.

Coding blocks 802 may be referred to based on their relative position within CTU 800. As one example, coding block 802A may be referred to as a top-left coding block. As another example, coding block 802B may be referred to as a top-right coding block. As another example, coding block 802C may be referred to as a bottom-left coding block. As another example, coding block 802D may be referred to as a bottom-right coding block.

CTU 800 may be located in a picture of video data along with other CTUs. The other CTUs may be located in areas that are referred to based on their relative position to CTU 800. As one example, top-neighboring area 804 may include one or more CTUs located above CTU 800. As another example, left-neighboring area 806 may include one or more CTUs located to the left of CTU 800. As another example, top-left-neighboring area 808 may include a CTU located to the top-left of CTU 800.

As discussed above, a video coder may utilize hybrid search areas for coding blocks of a CTU. For instance, the video coder may utilize a different search area for each of coding block 802. The search areas may be considered hybrid in that the search area for at least one coding block of coding blocks 802 includes samples of the current picture located outside of CTU 800, and the search area for at least one coding block of coding blocks 802 does not include samples of the current picture located outside of CTU 800.

The video coder may determine a respective search area for each coding block of coding blocks 802. In the example of FIG. 8, the video coder may determine that the search area for coding block 802A includes at least some samples located outside of CTU 800. For instance, the video coder may include up to N top line(s) above CTU 800 (e.g., up to N rows from above-neighboring area 804), up to M left column(s) of CTU 800 (e.g., up to M columns from left-neighboring area 806), and/or top-left neighboring area 808 in the search area for coding block 802A. As such, in some examples, the search area for coding block 802A may include samples from a coding block in a CTU located to the left of coding block 802A of CTU 800.

The video coder may determine that the search area for coding block 802B includes at least some samples located outside of CTU 800 and at least some samples located inside CTU 800. For instance, the video coder may include up to N top line(s) above CTU 800 (e.g., up to N rows from above-neighboring area 804) and/or samples from coding block 802A in the search area for coding block 802B.

The video coder may determine that the search area for coding block 802C includes at least some samples located outside of CTU 800 and at least some samples located inside CTU 800. For instance, the video coder may include up to M left column(s) of CTU 800 (e.g., up to M columns from left-neighboring area 806), samples from coding block 802A, and/or samples from coding block 802B in the search area for coding block 802B.

The video coder may determine that the search area for coding block 802C does not include samples located outside CTU 800. For instance, the video coder may include up samples from coding block 802A, samples from coding block 802B, and/or samples from coding block 802C in the search area for coding block 802B. However, the video coder may not include samples from left-neighboring area 806 in the search area for coding block 802B.

In view of the above, in some examples, the video coder may determine that the the respective search areas for the top-left coding block, the top-right coding block, and the bottom-left coding block include samples of the current picture located outside of the current CTU. For instance, the video coder may determine that the search areas for each of coding blocks 802A, 802B, and 802C include samples located outside of CTU 800. Similarly, the video coder may determine that the respective search areas for the top-left coding block and the bottom-left coding block include samples of the current picture located in a left-neighboring CTU of the current CTU. For instance, the video coder may determine that the search areas for each of coding blocks 802A and 802C include samples located in a CTU of left-neighboring area 806.

Additionally, in some examples, the video coder may determine that the respective search area for the bottom-right coding block does not include samples of the current picture located outside of the current CTU. For instance, the video coder may determine that the search area coding block 802D does not include samples located outside of CTU 800. Similarly, the video coder may determine that the respective search area for the bottom-right coding block includes the top-left coding block, the top-right coding block, and the bottom-left coding block. For instance, the video coder may determine that the search area for coding block 802D includes samples from coding blocks 802A, 802B, and 802C.

In accordance with a third technique of this disclosure, a video coder may code a current VPDU of a current CTU using CPR with a search area that includes previously coded VPDUs within the current CTU and the encoded area within the current VPDU. Which VPDUs are considered previously coded VPDUs may be a function of coding order.

Figure 9A:
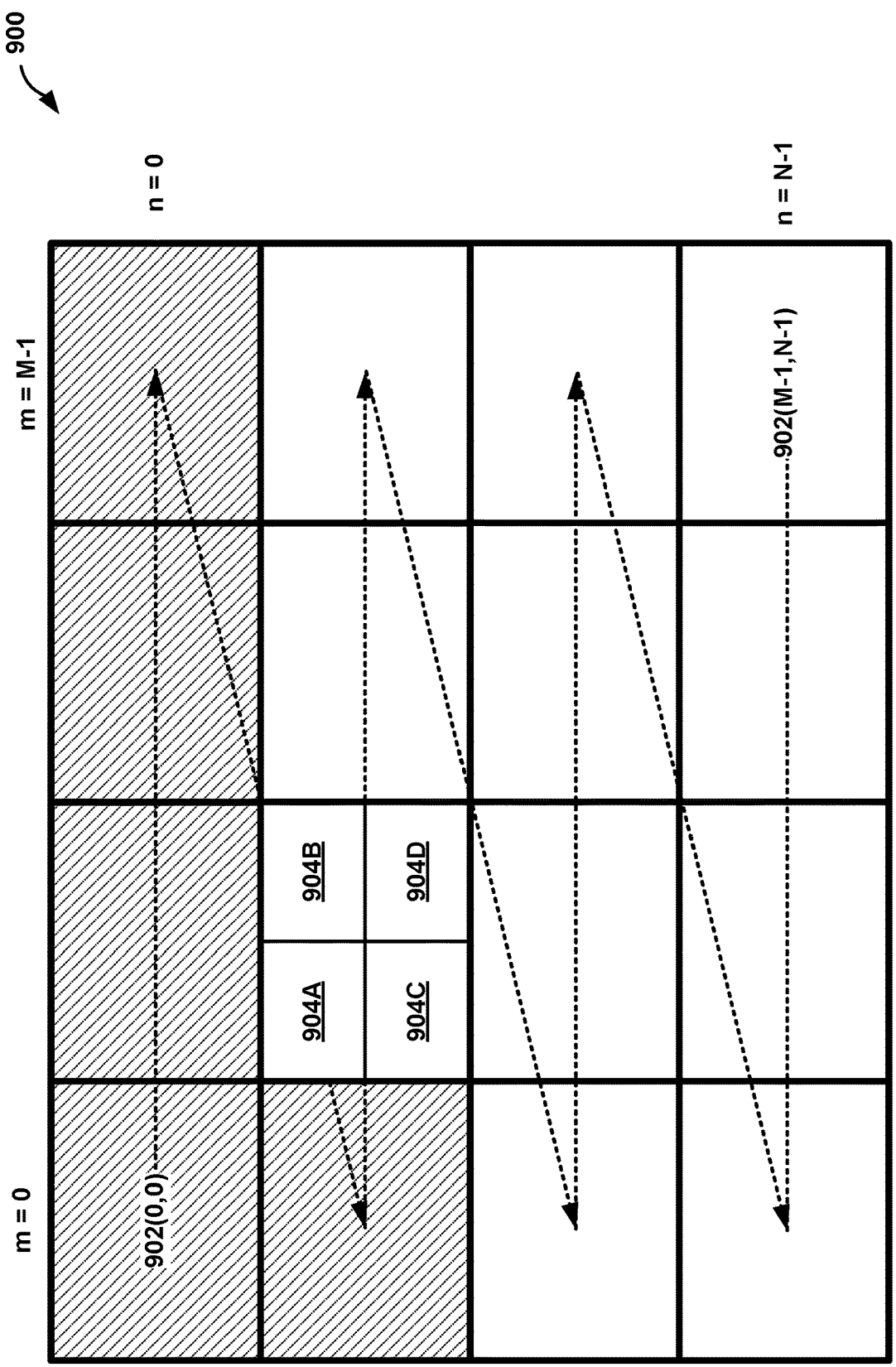
FIGS. 9A-9C are conceptual diagrams illustrating example search areas used for performing CPR with various scan orders, in accordance with one or more techniques of this disclosure.
Figure 9B:
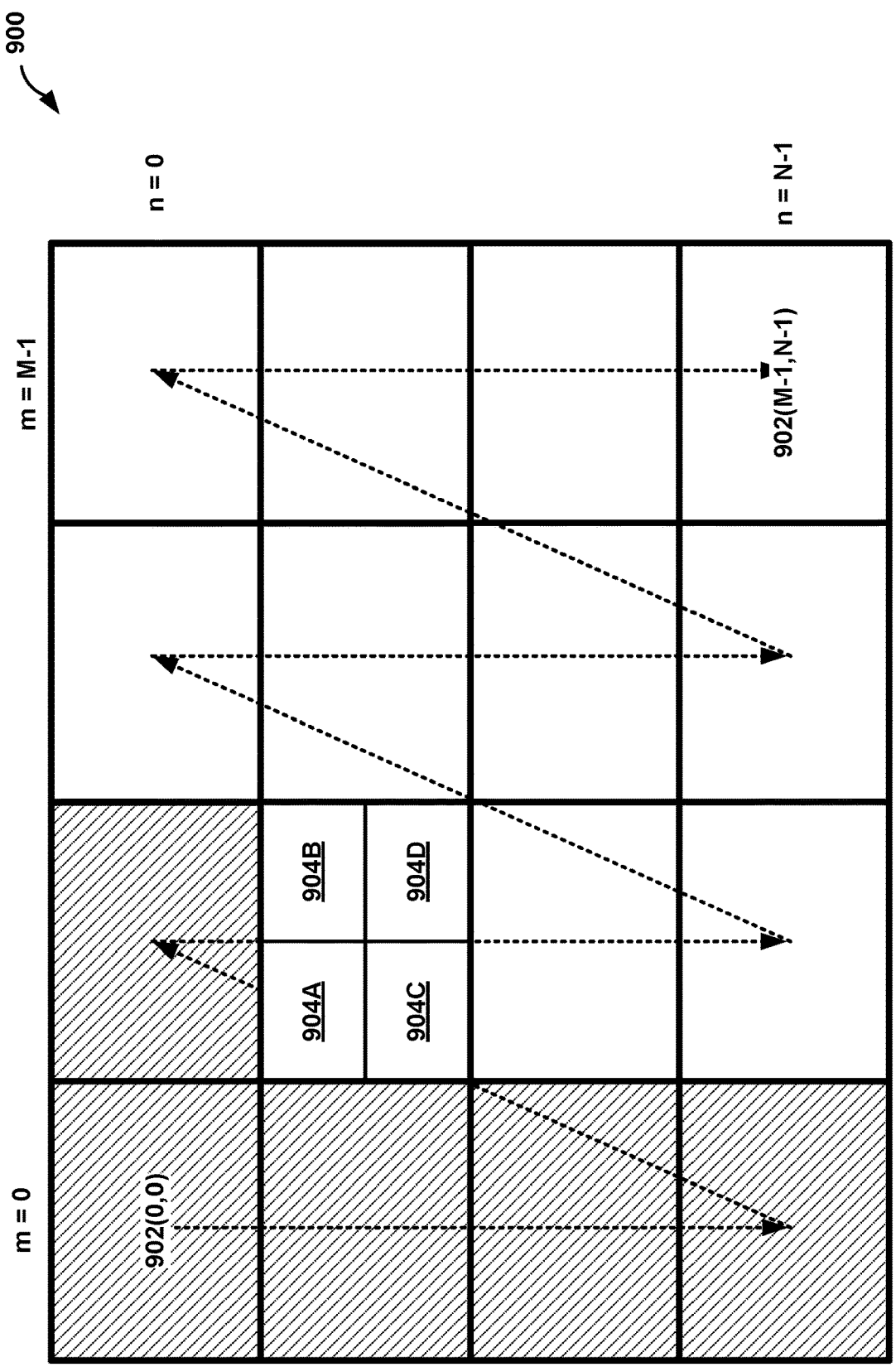
Figure 9C:
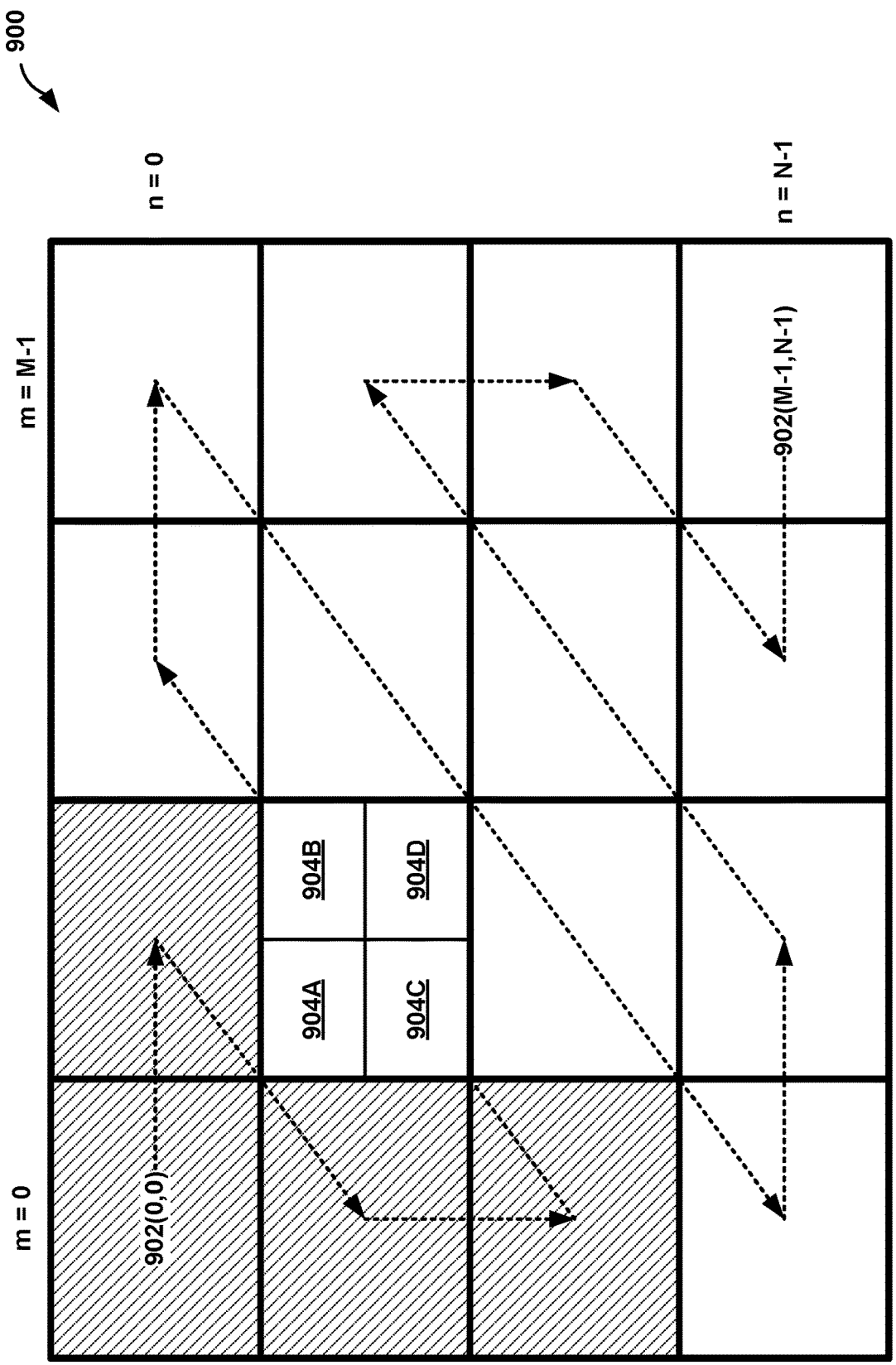

FIGS. 9A-9C are conceptual diagrams illustrating example search areas used for performing CPR with various scan orders, in accordance with one or more techniques of this disclosure. Each of FIGS. 9A-9C illustrates current CTU 900 divided into M×N VPDUs 902(0,0)-902(M−1,N−1) (collectively, "VPDUs 902"). For purposes of explanation, VPDU 902(1,1) will be used as the current VPDU. As shown in FIGS. 902A-902C, VPDU 902(1,1) may be divided into blocks 904A-904D (collectively, "blocks 904"). In each of FIGS. 9A-9C, the video coder may include the shaded VPDUs of VPDUs 902 in the search area used for VPDU 902(1,1) (i.e., the current VPDU).

FIG. 9A, illustrates an example search areas used for performing CPR with horizontal raster scan order (e.g., left to right, top to bottom). As shown in FIG. 9A, the video coder may include the VPDUs in the VPDU lines above the current VPDU, and the VPDUs to the left of the current VPDU at the same VPDU line in the search area for the current VPDU. In some examples, the video coder may include blocks within the current VPDU in the search area for other blocks within the current VPDU. For instance, the video coder may include blocks 904A, 904B, and 904C in the search area for block 904D. In some examples, the video coder may include VPDUs of VPDUs 902 shown in white color (unshaded), which contain samples from a previously processed CTU (e.g., the CTU immediately preceding CTU 900 in coding order) in the search area for blocks of CTU 900.

FIG. 9B, illustrates an example search areas used for performing CPR with vertical raster scan order (e.g., top to bottom, left to right). As shown in FIG. 9B, the video coder may include the VPDUs in the VPDU columns to the left of the current VPDU, and the VPDUs above the current VPDU at the same VPDU column in the search area for the current VPDU. In some examples, the video coder may include blocks within the current VPDU in the search area for other blocks within the current VPDU. For instance, the video coder may include blocks 904A, 904B, and 904C in the search area for block 904D. In some examples, the video coder may include VPDUs of VPDUs 902 shown in white color (unshaded), which contain samples from a previously processed CTU (e.g., the CTU immediately preceding CTU 900 in coding order) in the search area for blocks of CTU 900.

FIG. 9C, illustrates an example search areas used for performing CPR with zig-zag scan order. As shown in FIG. 9C, the video coder may include the VPDUs to the left of the current VPDU in the zig-zag order in the search area for the current VPDU. In some examples, the video coder may include blocks within the current VPDU in the search area for other blocks within the current VPDU. For instance, the video coder may include blocks 904A, 904B, and 904C in the search area for block 904D. In some examples, the video coder may include VPDUs of VPDUs 902 shown in white color (unshaded), which contain samples from a previously processed CTU (e.g., the CTU immediately preceding CTU 900 in coding order) in the search area for blocks of CTU 900.

Figure 10:
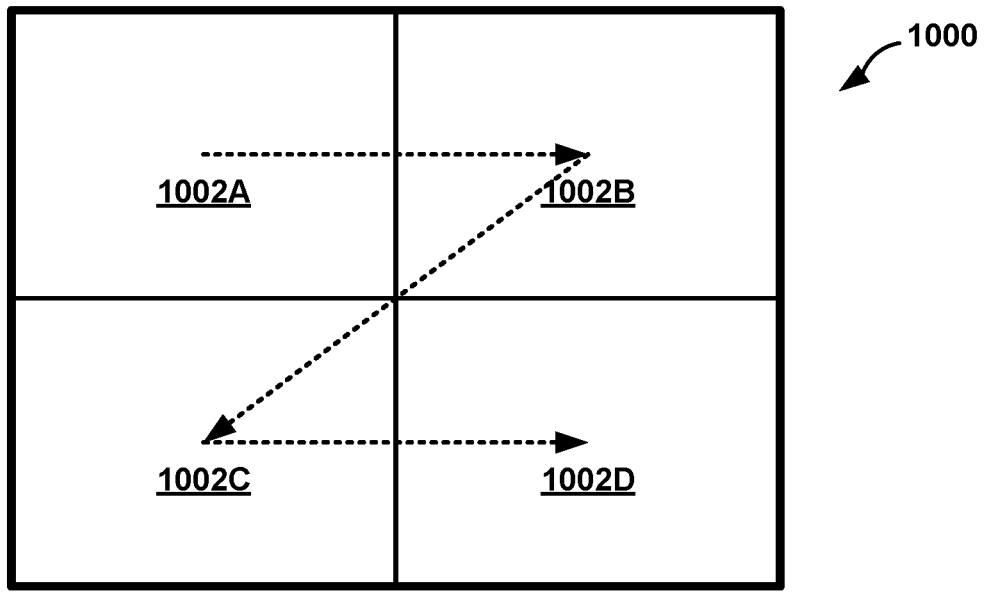
FIG. 10 is a conceptual diagram illustrating example search areas used for CPR, in accordance with one or more techniques of this disclosure.

FIG. 10 is a conceptual diagram illustrating example search areas used for CPR, in accordance with one or more techniques of this disclosure. As shown in FIG. 10, CTU 1000 may divided into four coding blocks 1002A-1002D (collectively, "coding blocks 1002"). In some examples, coding blocks 1002 may be referred to as VPDUs. For instance, where CTU 1000 include 128×128 samples, CTU 1000 may be split into VPDUs 1002, each of which may include 64×64 samples.

As discussed above, a video coder may include samples from previously coded VPDUs of a current CTU in a search area for a current VPDU of the current CTU (e.g., for performing CPR). As shown in FIG. 10, the coding order may be VPDU 1002A-1002B-1002C-1002D. In this example, the video coder may include VPDU 1002A in the search area for VPDU 1002B (e.g., VPDU 1002B may use VPDU 1002A for reference). The video coder may include VPDU 1002A and VPDU 1002B in the search area for VPDU 1002C. The video coder may include VPDUs 1002A-1002C in the search area for VPDU 1002D.

Figure 11:
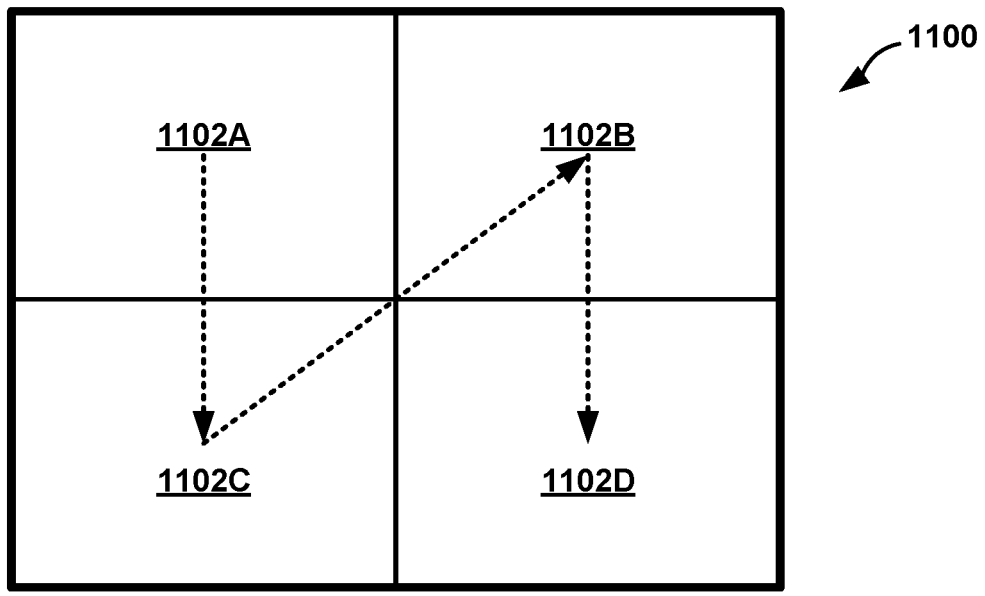
FIG. 11 is a conceptual diagram illustrating example search areas used for CPR, in accordance with one or more techniques of this disclosure.

FIG. 11 is a conceptual diagram illustrating example search areas used for CPR, in accordance with one or more techniques of this disclosure. As shown in FIG. 11, CTU 1100 may divided into four coding blocks 1102A-1102D (collectively, "coding blocks 1102"). In some examples, coding blocks 1102 may be referred to as VPDUs. For instance, where CTU 1100 include 128×128 samples, CTU 1100 may be split into VPDUs 1102, each of which may include 64×64 samples.

As discussed above, a video coder may include samples from previously coded VPDUs of a current CTU in a search area for a current VPDU of the current CTU (e.g., for performing CPR). As shown in FIG. 11, the coding order may be VPDU 1102A-1102C-1102B-1102D. In this example, the video coder may include VPDU 1102A in the search area for VPDU 1102C (e.g., VPDU 1102C may use VPDU 1102A for reference). The video coder may include VPDU 1102A and VPDU 1102C in the search area for VPDU 1102B. The video coder may include VPDUs 1102A-1102C in the search area for VPDU 1102D.

In accordance with a fourth technique of this disclosure, a video coder may include a combination of samples from neighboring CTUs and samples from other coding blocks in a current CTU in a search area for a coding block in the current CTU. For instance, the CPR search area of a VPDU may includes the neighbour samples and the reconstructed area within the current VPDU. The configuration and/or definition of the available-for-CPR reference area, which may comprise the neighbour samples and the size of the reference area, may depend on the position of the VPDU within a CTU.

FIGS. 12A-12D are conceptual diagrams illustrating example search areas used for performing CPR for various coding blocks of a CTU, in accordance with one or more techniques of this disclosure. Each of FIGS. 12A-12D illustrates current CTU 1200 divided into four coding blocks 1202A-1202D (collectively, "coding blocks 1202"). In some examples, coding blocks 1202 may be referred to as VPDUs. For instance, where CTU 1200 include 128×128 samples, CTU 1200 may be split into VPDUs 1202, each of which may include 64×64 samples. The shaded region in each of FIGS. 12A-12D may represent the search area uses for a current block. In each of FIGS. 12A-12D, the shaded region (and thus the search area) may include above lines 1204 (e.g., n above lines) and left columns 1206 (e.g., m left columns). The position of above lines 1204 and left columns 1206 may change based on the position of the current block.

Figure 12A:
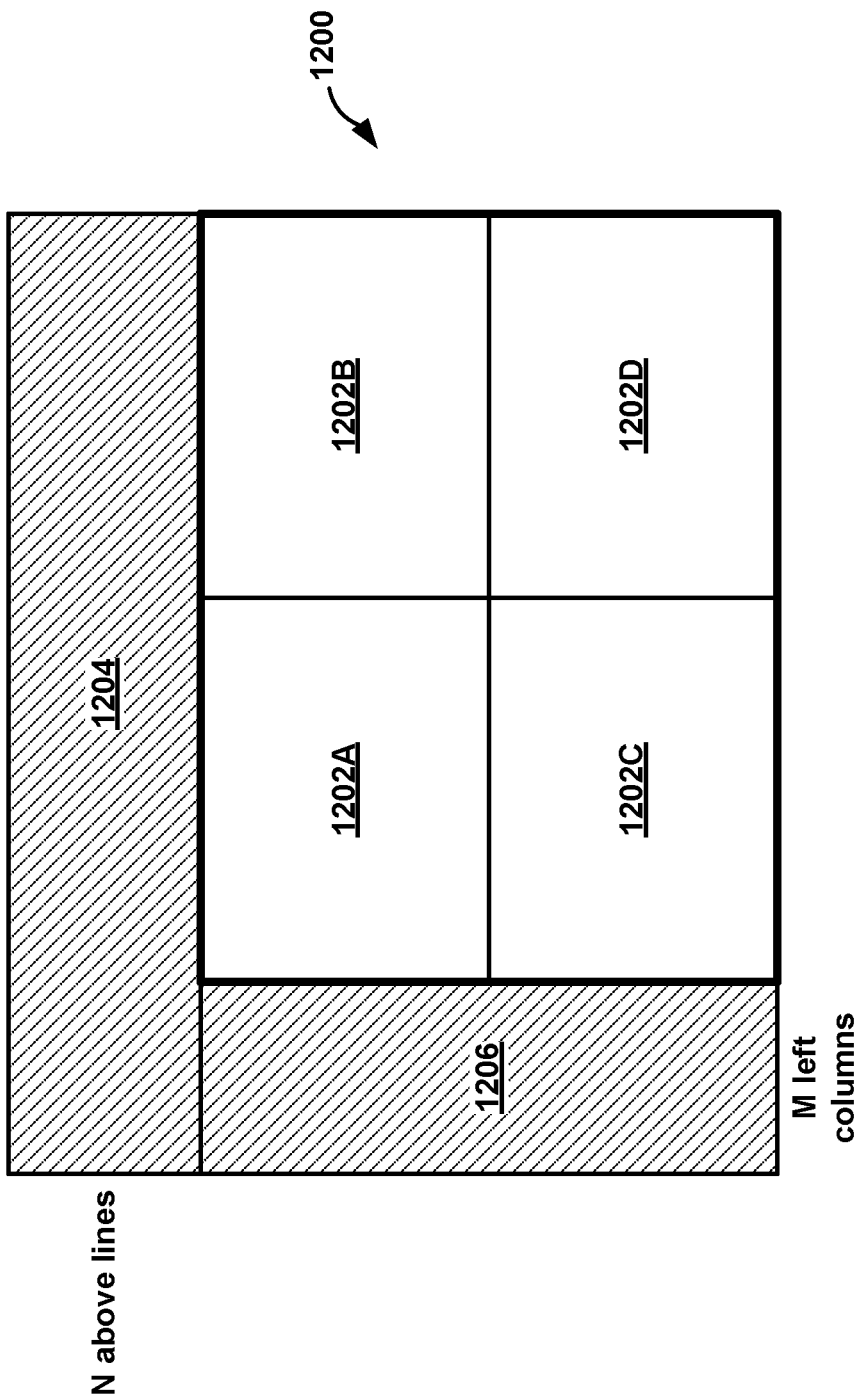
FIGS. 12A-12D are conceptual diagrams illustrating example search areas used for performing CPR for various coding blocks of a CTU, in accordance with one or more techniques of this disclosure.

FIG. 12A illustrates an example search area for coding block 1202A, also referred to as a top-left coding block. As shown in FIG. 12A, above lines 1204 and left columns 1206 may both be located outside of CTU 1200.

Figure 12B:
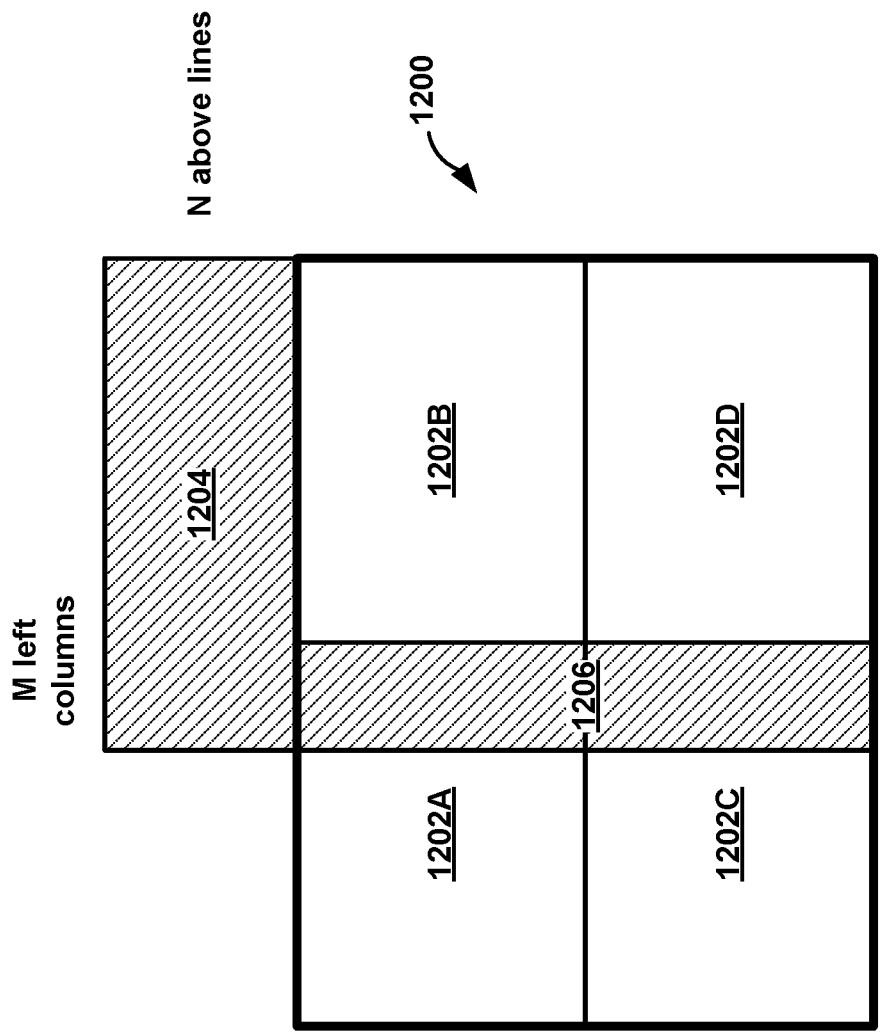

FIG. 12B illustrates an example search area for coding block 1202A, also referred to as a top-right coding block. As shown in FIG. 12B, above lines 1204 may be located outside of CTU 1200, while left columns 1206 may be at least partially located within CTU 1200.

Figure 12C:
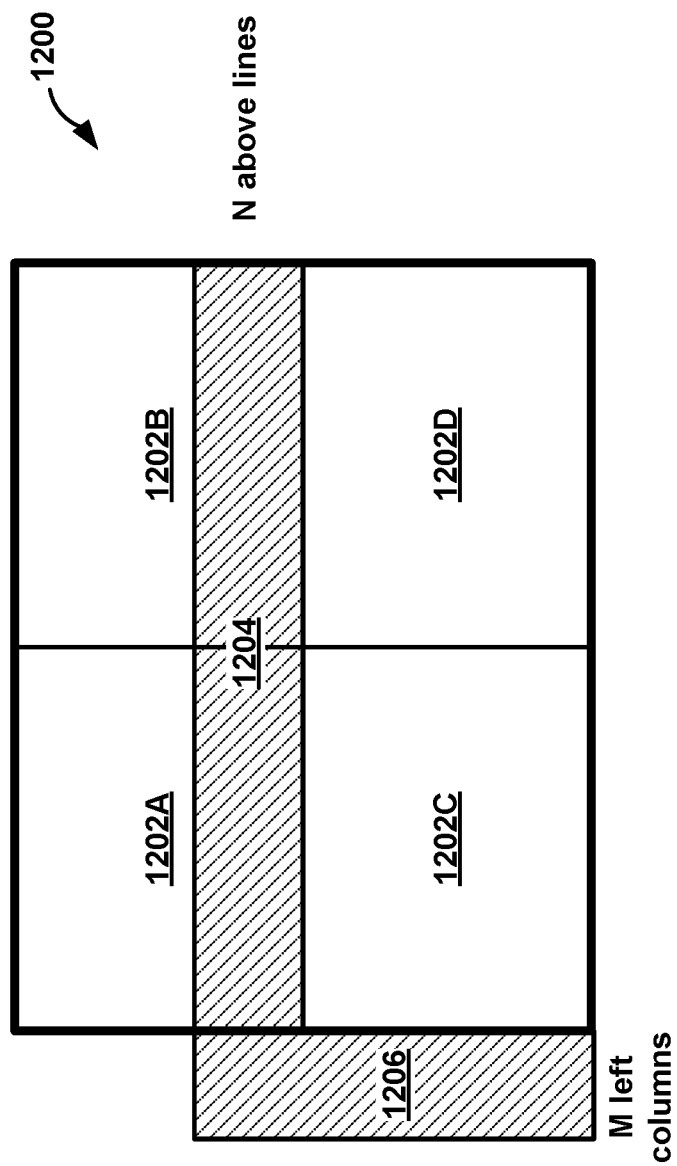

FIG. 12C illustrates an example search area for coding block 1202A, also referred to as a bottom-left coding block. As shown in FIG. 12C, left columns 1206 may be located outside of CTU 1200, while above lines 1204 may be at least partially located within CTU 1200.

Figure 12D:
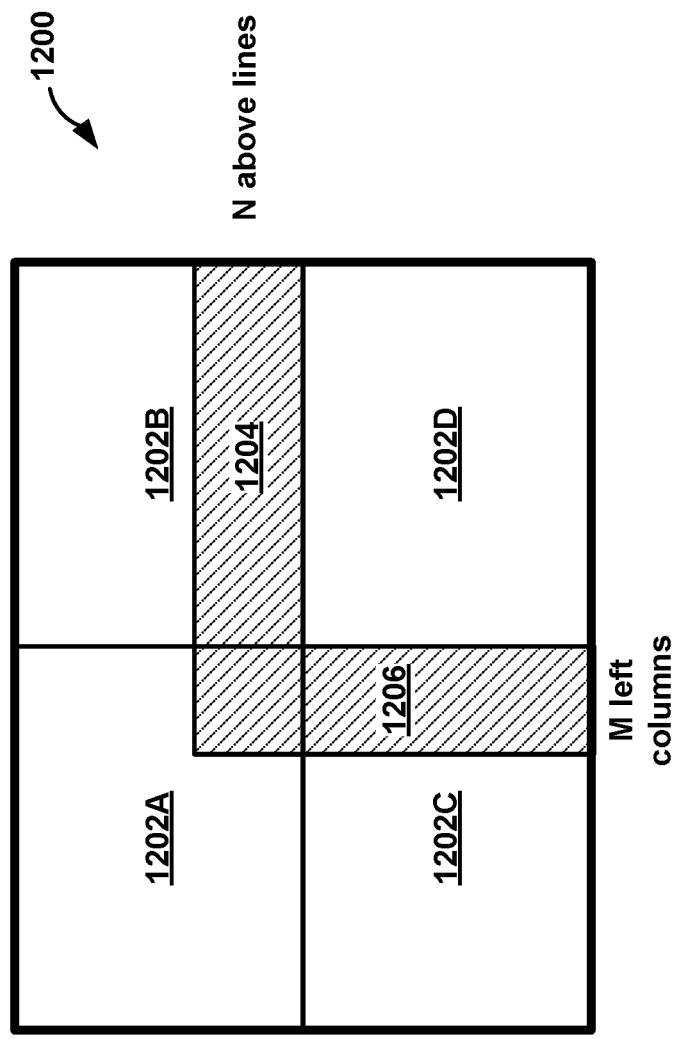

FIG. 12D illustrates an example search area for coding block 1202A, also referred to as a bottom-right coding block. As shown in FIG. 12D, above lines 1204 and left columns 1206 may both be located within of CTU 1200.

In one example, M, N, m, and n lines can be in the range from 1 to 4 inclusive. As mentioned earlier, in another example, M, N, m, and n can be determined by the number of lines required for other tools, such as intra prediction and deblocking filter.

In another example, M and N lines located outside of a CTU may have different count from m and n lines located inside the CTU. For example, M and N can be equal to 1, while m and n may be equal to 4.

In various examples, the techniques above can be applied to other CTU and VPDU sizes. For example, CTU size can be 256. In another example, VPDU size can be 32×32. Other VPDU and CTU sizes may also be utilized in combination with the above techniques.

Figure 13:
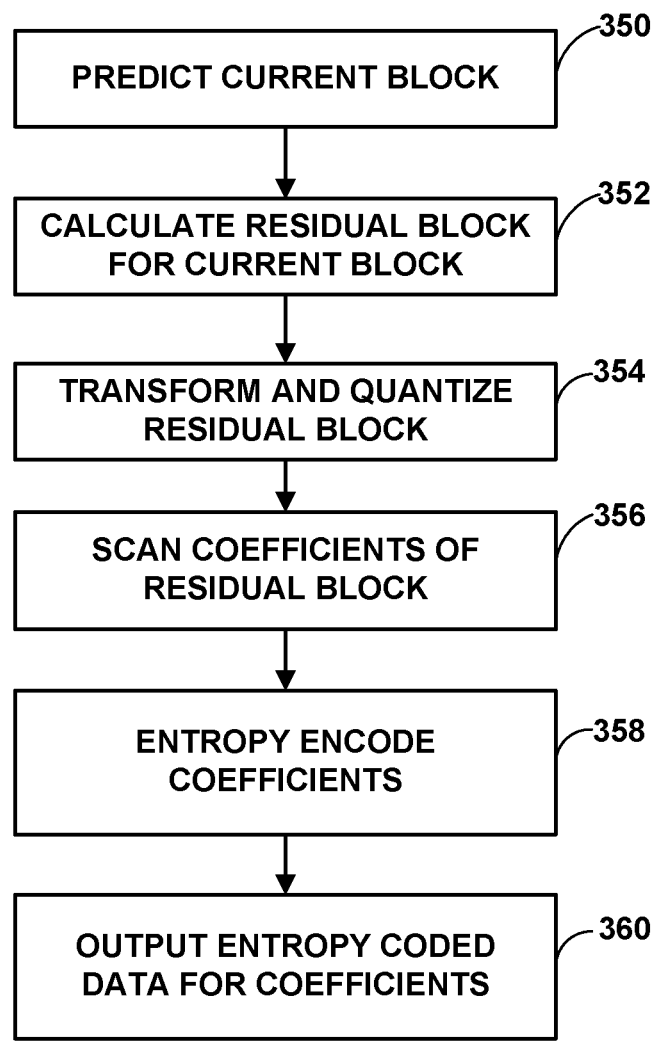
FIG. 13 is a flowchart illustrating an example method for encoding a current block.

FIG. 13 is a flowchart illustrating an example method for encoding a current block. The current block may comprise a current CU. Although described with respect to video encoder 200 (FIGS. 1 and 4), it should be understood that other devices may be configured to perform a method similar to that of FIG. 13.

In this example, video encoder 200 initially predicts the current block (350). For example, video encoder 200 may form a prediction block for the current block. For instance, where the current block is a current coding block of a plurality of coding blocks of a current coding tree unit (CTU), video encoder 200 may determine, for each respective coding block of the plurality of coding blocks, a respective search area of a plurality of respective search areas. In some examples, the search areas of the plurality of search areas may all be different. In some examples, at least one of the plurality of search areas includes samples of the current picture located outside of the current CTU. In some examples, at least one of the plurality of search areas does not include samples of the current picture located outside of the current CTU.

Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 14:
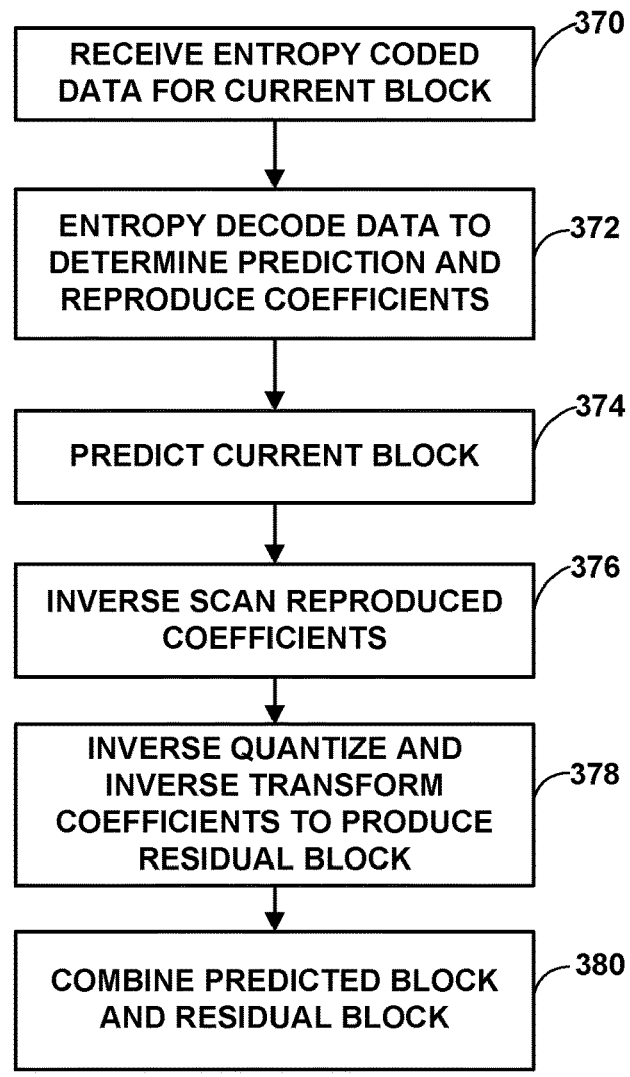
FIG. 14 is a flowchart illustrating an example method for decoding a current block.

FIG. 14 is a flowchart illustrating an example method for decoding a current block of video data. The current block may comprise a current CU. Although described with respect to video decoder 300 (FIGS. 1 and 5), it should be understood that other devices may be configured to perform a method similar to that of FIG. 14.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. For instance, where the current block is a current coding block of a plurality of coding blocks of a current coding tree unit (CTU), video decoder 300 may determine, for each respective coding block of the plurality of coding blocks, a respective search area of a plurality of respective search areas. In some examples, the search areas of the plurality of search areas may all be different. In some examples, at least one of the plurality of search areas includes samples of the current picture located outside of the current CTU. In some examples, at least one of the plurality of search areas does not include samples of the current picture located outside of the current CTU.

Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 15:
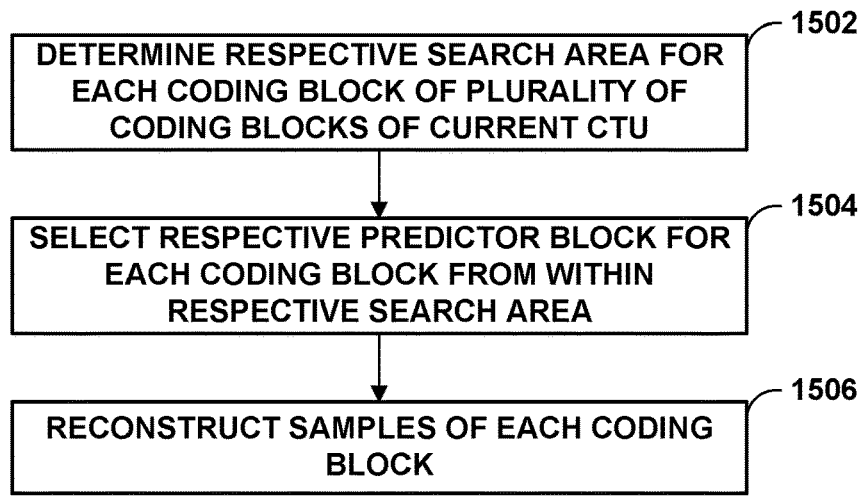
FIG. 15 is a flowchart illustrating an example method for predicting a block of video data in a current picture using hybrid search areas, in accordance with the techniques of this disclosure.

FIG. 15 is a flowchart illustrating an example method for predicting a block of video data in a current picture using hybrid search areas, in accordance with the techniques of this disclosure. The current block may comprise a current coding block of a current coding tree unit (CTU). Although described with respect to video encoder 200 (FIGS. 1 and 4), it should be understood that other devices may be configured to perform a method similar to that of FIG. 15. For instance, video decoder 300 (FIGS. 1 and 5) may be configured to perform a method similar to that of FIG. 15.

Video encoder 200 may determine a respective search area for each coding block of a plurality of coding blocks of a current CTU of a current picture (1502). For instance, video encoder 200 may determine a different search area for each of coding blocks 802 of FIG. 8. The various search areas may be considered hybrid search areas in that some include samples located outside of the current CTU and some do not include samples located outside of the current CTU.

At least one of the plurality of search areas may include at least some samples of the current picture located outside of the current CTU. For instance, the respective search areas for coding block 802A (e.g., the top-left coding block), coding block 802B (e.g., the top-right coding block), and coding block 802C (e.g., the bottom-left coding block) may include samples of the current picture located outside of CTU 800. As one example, the respective search areas for the top-left coding block and the bottom-left coding block may include samples of the current picture located in a left-neighboring CTU of the current CTU.

At least one of the plurality of search areas may not include samples of the current picture located outside of the current CTU. For instance, the respective search area for coding block 802D (e.g., the bottom-right coding block) may not include samples of the current picture located outside of CTU 800. As one example, the respective search area for the bottom-right coding block may include the top-left coding block, the top-right coding block, and the bottom-left coding block.

Video encoder 200 may select a respective predictor block for each coding block from within the respective search area of the coding block (1504). For instance, video encoder 200 may select a block from within the search area for coding block 802A that includes samples that most closely match samples of coding block 802A (e.g., that would yield the smallest residual values), select a block from within the search area for coding block 802B that includes samples that most closely match samples of coding block 802B, select a block from within the search area for coding block 802C that includes samples that most closely match samples of coding block 802C, and select a block from within the search area for coding block 802D that includes samples that most closely match samples of coding block 802D.

Video encoder 200 may determine a respective vector for each coding block, each respective vector identifying the respective predictor block for the respective coding block. For instance, video encoder 200 may determine a motion vector (also referred to as a block vector) that represents a displacement between coding block 802A and the predictor block for coding block 802A. The motion vector may have a horizontal component that represents a horizontal displacement between the coding block 802A and the predictor block for coding block 802A and a vertical component that represents a vertical displacement between coding block 802A and the predictor block for coding block 802A.

Video encoder 200 may encode, in a coded video bitstream, a representation of the vector. For instance, motion compensation unit 224 may select a motion vector predictor (MVP) and subtract the determined motion vector from the MVP to determine a motion vector difference (MVD). Motion compensation unit 224 may cause entropy encoding unit 220 to encode, in the coded video bitstream, one or more syntax elements that represent a value of the MVD. Video encoder 200 may similarly determine and encode a motion vector for each of coding blocks 802B-802D).

Video encoder 200 may reconstruct samples of each coding block (1506). For instance, as part of a reconstruction loop, video encoder 200 may add samples of the selected predictor block for coding block 802A to residual data to reconstruct the values of coding block 802A. Video encoder 200 may similarly reconstruct the samples of coding blocks 802B-802D (e.g., based on their respective predictor blocks and respective residual data).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
determining, for each respective coding block of a plurality of coding blocks of a current unit of video data in a current picture of the video data, a respective search area of a plurality of respective search areas, wherein the search areas of the plurality of search areas are all different, wherein the respective search area for a particular coding block includes M left columns of the particular coding block;
selecting, for each respective coding block and from within the respective search area for the respective coding block, a respective predictor block of a plurality of predictor blocks; and
reconstructing samples of each respective coding block based on samples included in a corresponding predictor block in the plurality of predictor blocks.

2. The method of claim 1, further comprising:
selectively determining, based on a coding characteristic of the particular coding block, a value of M for the particular coding block.

3. The method of claim 2, wherein the coding characteristic comprises a number of lines used by other tools.

4. The method of claim 1, wherein a value of M is in a range of 1 to 4, inclusive.

5. The method of claim 1, wherein the respective search area for the particular coding block includes N above lines of the particular coding block.

6. The method of claim 5, wherein a value of N is in a range of 1 to 4, inclusive.

7. The method of claim 1, wherein each of the coding blocks comprises a 64×64 sample block of video data.

8. The method of claim 1, further comprising:
decoding, from a video bitstream and for each respective coding block of the plurality of coding blocks, one or more syntax elements that represent a value of a vector that identifies the selected predictor block,
wherein selecting the predictor block for a respective coding block comprises selecting the predictor block based on the value of the vector.

9. The method of claim 1, further comprising:
encoding, in a video bitstream and for each respective coding block of the plurality of coding blocks, one or more syntax elements that represent a value of a respective vector that identifies the selected predictor block.

10. A device for coding video data, the device comprising:
a memory configured to store the video data; and
one or more processors implemented in circuitry and configured to:
determine, for each respective coding block of a plurality of coding blocks of a current coding tree unit (CTU) of the video data in a current picture of video data, a respective search area of a plurality of respective search areas, wherein the search areas of the plurality of search areas are all different, wherein the respective search area for a particular coding block includes M left columns of the particular coding block;
select, for each respective coding block and from within the respective search area for the respective coding block, a respective predictor block of a plurality of predictor blocks; and
reconstruct samples of each respective coding block based on samples included in a corresponding predictor block in the plurality of predictor blocks.

11. The device of claim 10, wherein the one or more processors are configured to:
  selectively determine, based on a coding characteristic of the particular coding block, a value of M for the particular coding block.

12. The device of claim 11, wherein the coding characteristic comprises a number of lines used by other tools.

13. The device of claim 10, wherein a value of M is in a range of 1 to 4, inclusive.

14. The device of claim 10, wherein the respective search area for the particular coding block includes N above lines of the particular coding block.

15. The device of claim 14, wherein a value of N is in a range of 1 to 4, inclusive.

16. The device of claim 10, wherein each of the coding blocks comprises a 64×64 sample block of video data.

17. The device of claim 10, wherein the one or more processors are further configured to:
  decode, from a video bitstream and for each respective coding block of the plurality of coding blocks, one or more syntax elements that represent a value of a vector that identifies the selected predictor block,
  wherein, to select the predictor block for a respective coding block, the one or more processors are configured to select the predictor block based on the value of the vector.

18. A non-transitory computer-readable storage medium having stored thereon instructions that, when executed, cause one or more processors to:
  determine, for each respective coding block of a plurality of coding blocks of a current coding tree unit (CTU) of video data in a current picture of video data, a respective search area of a plurality of respective search areas, wherein the search areas of the plurality of search areas are all different, wherein the respective search area for a particular coding block includes M left columns of the particular coding block;
  select, for each respective coding block and from within the respective search area for the respective coding block, a respective predictor block of a plurality of predictor blocks; and
  reconstruct samples of each respective coding block based on samples included in a corresponding predictor block in the plurality of predictor blocks.

19. The non-transitory computer-readable storage medium of claim 18, further comprising instructions that cause the one or more processors to:
  selectively determine, based on a coding characteristic of the particular coding block, a value of M for the particular coding block.

20. The non-transitory computer-readable storage medium of claim 18, wherein the respective search area for the particular coding block includes N above lines of the particular coding block, and wherein M is different than N.

* * * * *